May 7, 1963
W. D. J. HUTCHINGS
3,088,316
INDIVIDUAL MILK YIELD MEASURING APPARATUS
Filed Aug. 1, 1960
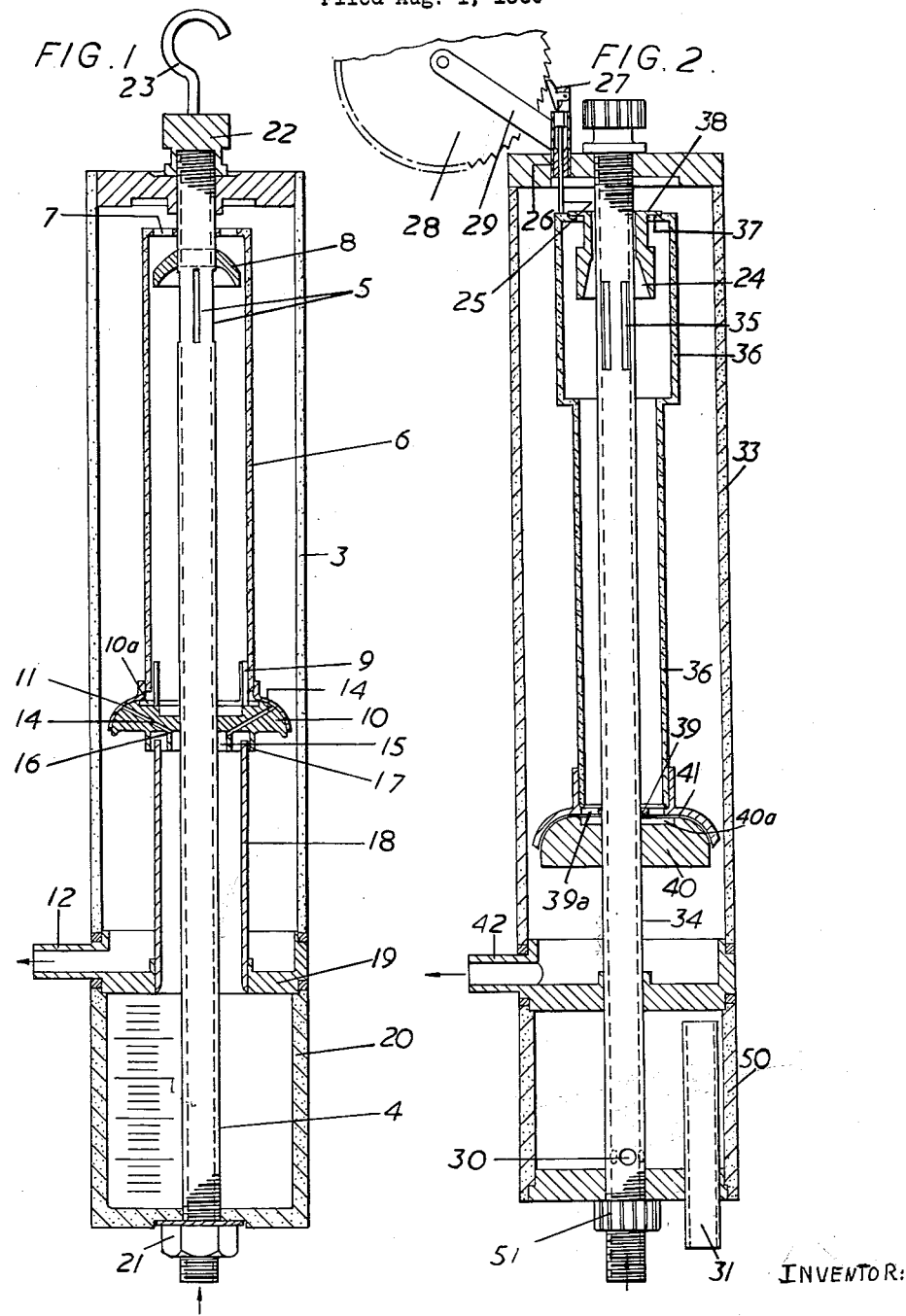
INVENTOR:
WILLIAM DAVID JOHN HUTCHINGS
By Albert H. Kronman
Attorney United States Patent Office 3,088,316
Patented May 7, 1963

3,088,316
INDIVIDUAL MILK YIELD MEASURING
APPARATUS
William David John Hutchings, Paynthouse Farm, Cann,
Shaftesbury, England
Filed Aug. 1, 1960, Ser. No. 46,672
Claims priority, application Great Britain Aug. 13, 1959
5 Claims. (Cl. 73—223)

This invention is concerned with the provision of apparatus for use in conjunction with a milking machine for measuring and visually indicating the milk yield of individual cows during the milking operation.

The apparatus of the present invention comprises a vertically movable inner vessel into which the milk is drawn under vacuum, means for the controlled escape of entrained air from the upper end of said vessel into an outer surrounding casing having an outflow connection in the lower part thereof to the vacuum pipe line of a milking machine, a bell-shaped mouth at the lower end of said inner vessel seating on a fixed closure member to seal the lower end of said inner vessel until the pressure of the column of milk building up in said inner vessel is sufficient to lift said bell-shaped mouth off said closure member and to raise said vessel to discharge the milk column rapidly into the outer casing and through said outflow connection, whereupon the inner vessel closes on to said closure member and the cycle of operations repeats itself until the milk supply is exhausted, and means for registering number of times said inner vessel discharges and thus indicating or registering the total volume of milk which has passed through the apparatus from the individual cow.

In one form of apparatus according to the invention, a fraction of the milk passing out through the bell-shaped mouth when the latter is lifted is withdrawn through one or more by-pass passages in the fixed closure member and is collected in a measuring and indicating vessel when the total volume of milk collected in the measuring vessel is a known fraction of the total milk yield of the individual cow.

In a modified form of the invention, recording means are provided for registering the number of times the inner vessel is discharged, thus giving a record of the total volume of milk which has passed through the apparatus.

Examples of the manner in which the invention may be carried into effect are hereinafter described with reference to the accompanying drawings in which FIG. 1 is a vertical sectional view of apparatus for separating and collecting a predetermined fraction of the milk in a measuring vessel.

FIG. 2 is a vertical sectional view of apparatus for registering the total volume of milk passing therethrough.

Referring firstly to FIG. 1, the device there shown comprises a closed outer cylindrical and preferably transparent casing 3 having a central milk inlet pipe 4 open below for the entry of the milk and having slots 5 near its upper end through which the milk can flow into an inner and preferably transparent vessel 6 in which the milk and entrained air is collected. The air escapes through orifices 7 in the top of vessel 6, and the milk is directed downwards by a deflector 8 secured to the pipe 4. The upper end of vessel 6 is freely movable on pipe 4 and is guided below by vertical guide blades 9 secured to a sealing member 10 which has in its upper face a circular recess 10a of an area not less than the cross-sectional area of tubular vessel 6. The lower end of vessel 6 has attached thereto a bell 11 which normally rests on the substantially spherical outer surface of the member 10. As the milk enters the vessel 6, it fills the recess 10a and rises in the vessel 6 until the weight of the milk column acts upwards in the recess 10a over an area greater than that of the internal cross-sectional area of the vessel 6 and lifts the latter sufficiently to cause the back pressure under the bell 11 to raise the bell to its fully open position. This takes place when the milk column attains about the lower edge of the deflector 8. The milk then flows rapidly downwards between the bell 11 and member 10 into the lower part of vessel 3. The milk flowing through the bell 11 to the vessel 3 escapes through an outlet connection 12, from whence it flows to the milk churn. A predetermined small fraction of the milk flowing over the member 10 is by-passed through one or more passages 14 drilled through the member 10, these passages 14 opening into a cavity 15 formed by a concentric web 16 on the underside of the member 10. Between the web 16 and a similar web 17 of larger diameter, the upper end of a tube 18 is loosely received, the lower end of tube 18 being fixed to the base 19 of vessel 3. The tube 18 opens below into a measuring vessel 20 detachably secured to the underside of base 19, as by a nut 21 screw-threaded upon pipe 4. The milk fraction withdrawn through by-pass passages 14 flows down into the measuring vessel 20. To return the measured milk volume to the main flow, the whole unit may be inverted, when the milk in vessel 20 will flow back through tube 18 over the edge thereof between webs 16 and 17 to outlet connection 12.

The tube 18 and vessel 20 may be of transparent material, for example a transparent synthetic resin such as polystyrene, polythene or the like may be used in the manufacture of some or all of the parts.

The pipe 4 is secured to the top of vessel 3, as by a nut 22 which may be provided with a hook 23 for suspending the device.

It will be understood that, as the lower end of pipe 4 is connected to the pulsating teat cups and the outlet connection 12 is connected to the suction pipe line of the milking machine, the interior of the vessel 3 is under vacuum.

It will be seen that the sealing member 10 has a curved upper outer surface merging into a lower substantially cylindrical surface, and that the bell 11 is similarly shaped. By reason thereof, the initial lifting of the vessel 6 causes the lip of bell 11 to rise vertically without any increase in the cross-sectional area between said lip and the cylindrical portion of member 10, so that the milk entering between the curved portion of the bell 11 and the member 10 is subjected to a back-pressure which raises the bell 11 still further, thus increasing the lift of the vessel 6, when the latter empties rapidly.

So soon as the milk has been fully discharged, the vessel 6 and bell 11 descend to normal position in which the bell 11 seats on the sealing member 10, when the cycle of operations repeats itself.

The milk fraction collected in the transparent indicating and measuring vessel can be constantly under view for observation as to quantity, quality and colour and constitutes an accurate proportion of the total volume of milk passing through the apparatus, thereby indicating the total yield of milk. The collected milk fraction may also be used as a sample for butterfat or other tests.

FIG. 2 illustrates a modification in which the total volume of milk is measured in its passage through the apparatus, which comprises a closed outer casing 33 having a central milk inlet pipe 34 open below for connection to the suction pipe from the pulsating teat cups, the pipe 34 having slots 35 near its upper end through which the milk flows into an inner vertically movable vessel 36. A central aperture 37 in the upper end of vessel 36 is controlled by a vertically movable valve 38 freely movable on pipe 4 and normally seating on aperture 37. Valve 38 is formed at its lower part as and loaded by a deflector 24 for the milk issuing through slots 35. The lower end of vessel 36 is attached to a bell 41 which co-operates with a sealing member 40 and at its lower end the vessel 36 is guided on the pipe 34 by an annular disc 39 secured to the bell 41 and provided with outlet orifices 39a above a circular recess 40a in the upper face of member 40, the recess 40a being of an area not less than the cross-sectional area of tubular vessel 36. The member 40 is fixed to pipe 34 and as the milk rises in vessel 36, air escapes through valve 38 until the pressure of the milk column which builds up in the vessel 36 acts upwards in the recess 40a to lift the vessel 36 and bell 41, when the milk begins to flow over the member 40 and as the flow increases the increasing pressure between member 40 and bell 41 further lifts the bell 41, thus discharging the liquid in vessel 36 through an outlet connection 42 in the lower part of outer casing 33. When the vessel 36 rises, a touch pin 25 resting on the upper end of vessel 36 and vertically guided in a housing 26 mounted on the upper end of outer casing 33 raises a catch 27 pivoted on the upper end of the touch pin to turn a ratchet wheel 28 through one tooth, the ratchet wheel 28 being carried by a bracket 29 secured to the top of outer casing 33. When the inner vessel 36 empties, it descends to normal position and the cycle of operations repeats itself until the cow has been fully milked. The ratchet wheel 28 may be suitably graduated to indicate the amount of milk passed through the apparatus, and thus the total milk yield.

A lower vessel 50 is secured by nut 51 on pipe 34 to the lower end of outer casing 33, in which case the pipe 34 has orifices 30 opening into vessel 50 which has an air inlet tube 31 fitted thereto and preferably connected to the pulsating pipe line of the milking machine to enable air to be drawn into pipe 34 with the milk, for the purpose of maintaining a sufficient quantity of air in vessel 36 to replace the milk flowing out of the vessel.

The sealing member 40 and bell 41 are substantially similar in construction and function to the sealing member 10 and bell 11 of FIG. 1, except that the member 40 has no by-passages drilled therein.

While I have shown a pin 25, pawl 27 and ratchet wheel 28 for indicating the number of times the vessel 36 rises and discharges, it will be obvious that any other counting mechanism operated by the lift of vessel 36 could be provided.

I claim:

1. Individual milk yield measuring and indicating apparatus comprising a vertically movable vessel, a milk inlet pipe opening into the upper part thereof, a bell-shaped mouth at the lower end of said vessel, a fixed closure member on to which said bell-shaped mouth seats to seal the lower end of said vessel, said closure member having in its upper face a recess of an area not less than the cross-sectional area of said vessel, whereby the milk entering said vessel fills said recess and rises in said vessel until the pressure of the column of milk building up in said vessel lifts said vessel and unseats said bell-shaped mouth, an outer casing into which said vessel discharges said milk column when said vessel is lifted, a suction outlet connection at the lower part of said casing, an air vent in the upper part of said vessel, and means for registering the number of times said vessel discharges until the milk supply is exhausted.

2. Individual milk yield measuring and indicating apparatus comprising a vertically movable milk-receiving vessel, a milk inlet pipe opening into the upper part of said vessel, a valve member carried at the lower end of said vessel, a valve seat on which said valve member rests to seal the lower end of said vessel, said valve member having in its upper face a circular recess of an area not less than the cross-sectional area of said milk-receiving vessel, whereby the milk entering said vessel fills said recess and rises in said vessel until the column of milk building up in said vessel causes said vessel to lift and unseat said valve member, an outer casing into which said vessel discharges when said valve member is unseated, an air vent opening from the upper part of said vessel into said outer casing, and means indicating the number of times said vessel discharges until the milk supply thereto ceases.

3. Apparatus according to claim 2 in which said registering means includes means for withdrawing a predetermined fraction of the milk discharged from said vessel at each discharge thereof, and a measuring chamber in which said fractions are collected.

4. Apparatus according to claim 1 including a by-pass passage in the fixed closure member opened by the lifting of said vessel to by-pass a predetermined fraction of the milk discharged from said vessel at each discharge thereof, and collecting means for the by-passed fractions.

5. Apparatus for measuring and indicating individual milk yield comprising an outer casing having a lower outlet for connection to the suction pipe line of a milking machine, an inner vessel guided for vertical movement within said outer casing, an air vent in the top of said vessel in communication with the upper interior of said casing, a milk inlet connection opening into the upper part of said vessel, valve means closing the lower end of said vessel and opening when the weight of milk building up in said vessel is sufficient to open said valve means and discharge the column of milk into said outer casing, said valve means comprising a fixed valve seat having a curved upper annular outer surface merging into a lower substantially vertical cylindrical outer surface, a valve carried at a lower open end of said inner vessel, said valve seating on and conforming substantially on its under surface to the shape of said valve seat, and said valve seat having in its upper face a circular recess of an area not less than the cross-sectional area of said vessel to receive the milk which initially enters and thereafter builds up in said vessel, and means indicating the number of times said vessel discharges until the milk supply thereto ceases.

References Cited in the file of this patent

UNITED STATES PATENTS

| | | |
|---|---|---|
| 159,419 | Knowlton | Feb. 2, 1875 |
| 879,141 | Bramley-Moore | Feb. 18, 1908 |
| 1,548,166 | Peters | Aug. 4, 1925 |
| 2,936,616 | Benbow | May 17, 1960 |